United States Patent [19]

Swensrud

[11] Patent Number: 4,661,680

[45] Date of Patent: Apr. 28, 1987

[54] END-OF-ARM TOOLING CAROUSEL APPARATUS FOR USE WITH A ROBOT

[75] Inventor: Roger L. Swensrud, Plum Boro, Pa.

[73] Assignee: Westinghouse Electric Corp., Pittsburgh, Pa.

[21] Appl. No.: 750,720

[22] Filed: Jun. 28, 1985

[51] Int. Cl.⁴ .............................................. B23K 26/00
[52] U.S. Cl. .......................... 219/121 LU; 219/121 L; 219/121 LV; 901/42
[58] Field of Search ................. 219/121 LG, 121 LH, 219/121 L, 121 LC, 121 LU, 121 LV, 121 M, 121 EM, 121 LY, 121 EK, 121 EH, 121 ES; 901/41, 42, 45

[56] References Cited

U.S. PATENT DOCUMENTS

| Re. 31,042 | 9/1982 | Clark et al. | 219/121 L |
| 3,720,213 | 3/1973 | Hobart et al. | 219/121 LP |
| 3,782,823 | 1/1974 | Kantorski et al. | 219/121 L |
| 4,459,498 | 7/1984 | Vetsch et al. | 219/121 FS |

FOREIGN PATENT DOCUMENTS

2120202 11/1983 United Kingdom ........ 219/121 LG

Primary Examiner—M. H. Paschall
Attorney, Agent, or Firm—Thomas R. Trempus

[57] ABSTRACT

This disclosure relates to automated manufacturing apparatus and systems. The invention is provided to an integrated carousel system to provide selected end-of-arm tooling for use in a laser material processing system in a laser-robotic, work cell.

2 Claims, 6 Drawing Figures

END-OF-ARM TOOLING CAROUSEL APPARATUS FOR USE WITH A ROBOT

FIELD OF THE INVENTION

This invention relates to automated manufacturing apparatus in general and systems which use such apparatus. More particularly, this invention is directed to an integrated carousel system to provide end-of-arm tooling for use in a laser material processing system in a laser-robotic, work cell.

BACKGROUND OF THE INVENTION

The general acceptance of industry automation as a central requirement for improving productivity has increased the acceptance level of the robot or manipulator apparatus as a mechanism for achieving automated industrial applications. The acceptance of robots as a useful, industrial "tool" has resulted in a market demand for robot systems exhibiting simplified design characteristics of a machine tool suitable for control by a conventional computer numerical control, direct numerical control and off-line programming with languages such as an Automatic Programming Tool (APT).

High powered lasers are ideally suited to be used as a source of heat in various material processing applications which include the vaporization of materials, drilling and cutting operations. Lasers are also applicable to procedures, such as welding or surface cladding of materials, that it to say, processes and procedures which require the melting of materials. Also, the temperature of solid phase materials can be varied by the use of the laser in hardening and annealing operations.

The thermal effects which are experienced by materials when exposed to the laser beam are primarily dependent upon the intensity of the laser energy, the absorptivity of the material, and the length of time during which the material is exposed to the laser beam. Precise control over these parameters determines the resulting change in the phase or the state of the material. Usually, when lasers are used in processes such as welding, cutting and surface treatment, the area of the workpiece to be processed is oriented in such a way that is it nearly normal to the laser beam with the beam impinging squarely on the workpiece surface. This configuration optimizes the absorptivity of the material and facilitates its heating. Generally, the laser and the workpiece are caused to move relative to each other. This relative motion can be accomplished in two ways. First, the beam can be traversed over a stationary workpiece. Second, the workpiece can be manipulated under a fixed laser beam. Typically, the former method requires that the laser beam be moved either by mounting the laser on a movable device or by directing the beam from the fixed laser to the workpiece by use of a movable optical system.

A dedicated effort has been directed to the optimization of the use of industrial manipulators and high powered lasers to provide an integrated laser robot system. U.S. patent application Ser. No. 485,076, entitled "General Purpose Orthogonal Axes Manipulator System" by Daniel P. Soroka et al., which is assigned to the assignee of the present invention, discloses an overhead gantry style robot with a large rectangular working envelope. This robot permits programming in Cartesian coordinates as contrasted with the more complicated polar coordinates. This gantry robot design provides a rigid manipulator that supports machine tool-type interpolation moves, high accuracy and repeatability while permitting robotic-type velocity and dexterity. The gantry design provides for an overhead X axis assembly supported by vertical structural members. The Y axis assembly extends as an arm from the X axis assembly and further supports a vertical Z axis assembly. In addition to the orthogonal X, Y and Z axis assemblies, a mounting surface on the Z axis assembly is designed to accommodate a multiple axis rotary wrist to which an appropriate end effector can be attached. It is to this end effector that the present invention is more specifically directed as will be seen below.

Allowed U.S. patent application Ser. No. 460,346, which is entitled "Robotic Laser Beam Delivery Apparatus" by Daniel J. Plankenhorn, which application is assigned to the assignee of the present invention, discloses a light beam directing apparatus which permits a reflected beam of light such as a laser, to be directed in a path which comprises a plurality of straight segments. Each segment of the beam is associated with a segment of a robot's axis in a fixed spatial relationship. The aforedescribed patent applications describe only a portion of a total system which can be utilized to provide a complete work cell.

A significant advantage of a system as described above which incorporates a robot and a laser resides in the fact that the same machine can accomplish drilling, cutting, welding, surfacing, alloying/cladding, hardening and annealing with only a "tool" change of the focussing optics and a programming adjustment of beam power and exposure time. The ultimate system for use in such material processing would include all tooling changes in software control thus using the full versatility of the laser and robot system. Unfortunately, a problem resides in the fact that the changing of the focussing optics to obtain different focal lengths, spot sizes, intensities and etc. is a manual operation.

It is, therefore, an object of this invention to eliminate the manual operation of changing end-of-arm tooling by locating different sets of "tooling" on a carousel at the end of the robot's arm and manipulating this carousel and the tooling located thereon through the use of servo-control from the robot control.

It is a further object of this invention to provide end-of-arm tooling which provides two or more end effectors which can be automatically controlled through the robot or system controller.

It is a further object of this invention to provide an end effector which through a solenoid actuated mechanism which couples in a light leak-proof fashion, automatically to the beam conveyance system which delivers the laser beam from the laser to the workpiece.

It is a futher object of this invention to provide one or more end effectors disposed in a carousel relationship for automatic movement and control by the robot or system controller.

It is yet again another object of this invention to provide a carousel system for use in combination with a generic shield for a variety of material processes.

SUMMARY OF THE INVENTION

The present invention provides a carousel tooling apparatus for use in combination with an integrated robot-laser system. The robot-laser system includes a robotic system having one or more mechanical joints defining at least in part a first axis of motion and a second axis of motion. These axes of motion define a contour path through the robotic system's geometric range of motion and wherein each of the mechanical joints defines in part a frame member. A wrist assembly is adapted to mountably receive thereon an end effector or the like in order to impart at least rotational movement to the end effector. The wrist assembly would typically be mounted at the end of the Z axis arm of the robot. An integral laser beam delivery system for the delivery of a beam along any point within the geometric range of motion of the robot to a terminal location proximate the wrist assembly is incorporated with the robotic system. The integral laser beam delivery system includes a plurality of optical joints and tubular members disposed between adjacent optical joints. It is through the tubular members that the beam passes as it travels from optical joint to optical joint. The carousel tooling apparatus for use in combination with the afore-described robot laser system comprises a base member adapted to be mounted onto the wrist assembly such that rotational movement is imparted to the base member through the rotation of the axis member. The base member has a first tooling station thereon and at least a second tooling station thereon such that the rotational movement of the base member, as effected by the wrist assembly, selectably presents each of the tooling stations to the terminal location of the laser beam delivery system. A tooling station can comprise means defining a set of focusing optics and means for coupling the focusing optics with the integral laser beam delivery system wherein a predetermined focal length, spot size or intensity of the laser beam is established. Additionally, the carousel tooling of this apparatus can be used in combination with a generic shield that can be used in a variety of metal processes.

This invention additionally provides a solenoid actuated mechanism which provides a technique whereby light leak-proof couplng is effected between the laser beam delivery system and the end optics utilized in establishing the focal length, spot size, etc. of the laser beam. Additionally, a spring load cover assembly is provided which cooperates with the open beam transmission tube to provide a sealing technique for protecting each set of optics from foreign material which could contaminate the optical elements making up the end effector.

BRIEF DESCRIPTION OF THE DRAWINGS

The above, as well as other features and advantages of the present invention can be readily appreciated through consideration of the detailed description of the invention in conjunction with the accompanying drawings, in which.

DETAILED DESCRIPTION OF THE INVENTION

Figure 1:
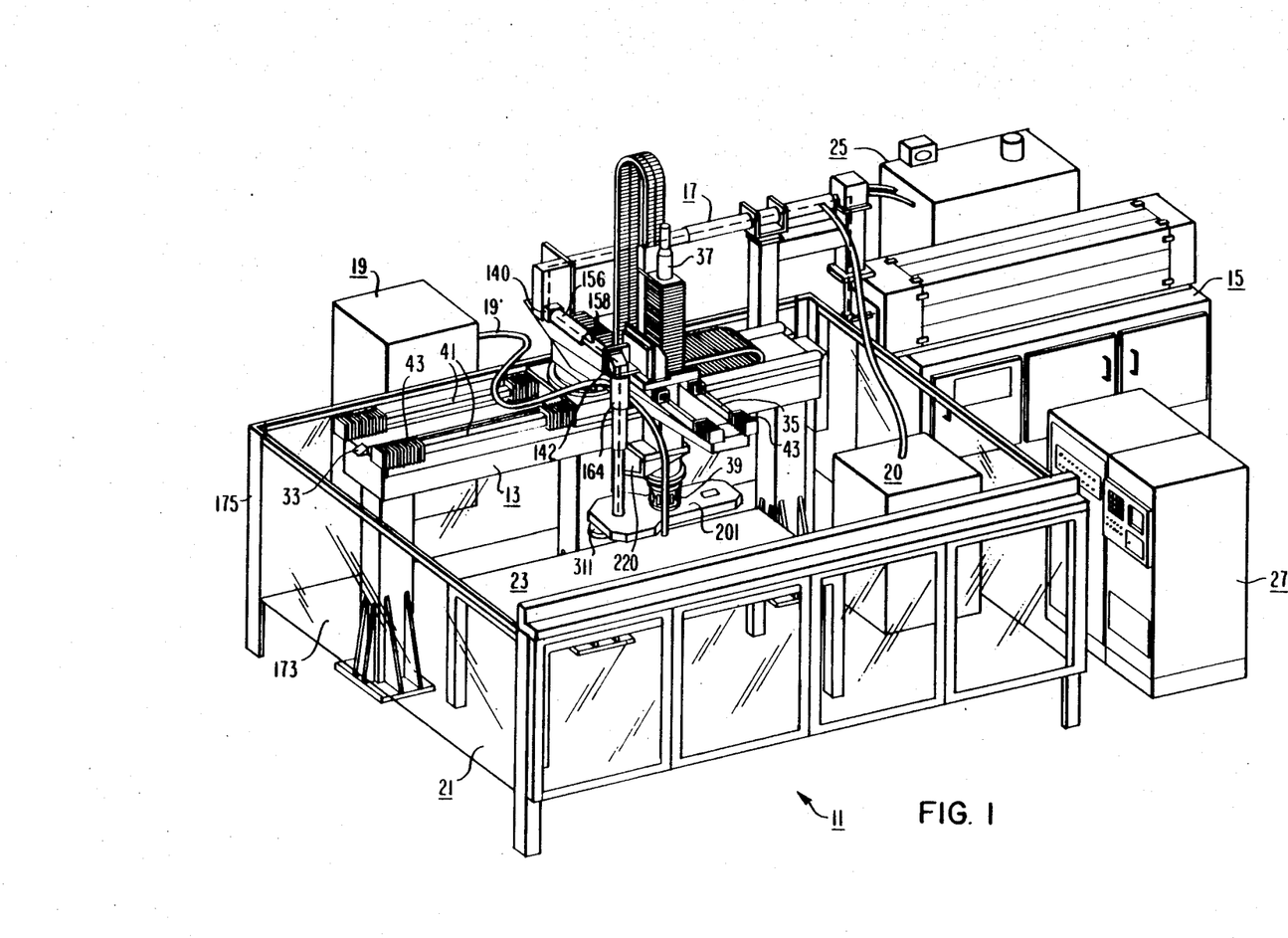
FIG. 1 is an isometric view of an orthogonal axis manipulator system incorporating a laser beam delivery system and the unique carousel end-of-arm tooling of this invention.

A complete, integrated robot laser work cell is isometrically presented in FIG. 1 and generally indicated by the reference character 11. The robot laser system 11 includes an orthogonal axis manipulator system 13 to which is coupled a laser system 15 by means of a laser beam delivery system 17. The system 11 also includes an exhaust system at 19, a safety enclosure means 21 and a precision table or other fixture as at 23. A coolant chiller for the optics used in the laser beam delivery system as well as in the generic shield is indicated at 25. The programmable controller by which the orthogonal axis manipulator is directed is indicated at 27. It should be appreciated that the end-of-arm tooling or end effectors utilized in combination with the laser beam delivery system 17 and the orthogonal axis manipulator 13 is an application dependent variable. Accordingly, the desired work to be effected by the laser-robot system dictates the specific tooling to be utilized with the robot as well as the number of individual end effectors or "tools" which will be provided in the carousel end-of-arm tooling apparatus of this invention and generally indicated by the reference character 201. This carousel 201 will be described in detail in conjunction with FIG. 3 below.

The manipulator system 13 comprises three orthogonal axes assemblies consisting of the X axis assembly 33, the Y axis assembly 35, and the Z axis assembly 37. A wrist mechanism 39 is mechanically coupled to the Z axis assembly 37 to accommodate the end-of-arm tooling carousel 201 of this invention. The end-of-arm tooling carousel 201 is provided with optics necessary to affect various metal processing applications which are effected in combination with the laser beam delivery system 17.

The operative combination of the X, Y and Z axes assembly is supported in a gantry type configuration by the vertical support members SM which are secured to the floor F of the working facility. Machine tool-type control of the operation of both the manipulator system 13 and the carousel end-of-arm tooling 201 is implemented by a conventional numerical control console 27 such as the PRODUCERv CNC System which is available from the Westinghouse Electric Corporation. The orthogonal axis machine tool-type configuration of the X, Y and Z axes assemblies elevated in the gantry configuration results in optimized working envelope corresponding to a generally rectangular volume work zone. This gantry configuration of an orthogonal axis manipulator system significantly reduces the number of wrist articulations required to implement a desired work process, and further reduces requirements for auxiliary devices such as rotary tables. It should, however, be appreciated that the use of an auxiliary device such as the aforementioned rotary table can provide an extremely enhanced flexibility to the manufacturing capabilities provided in this work cell. Pulse width modulated drive for the closed loop DC servo motor arrangements of each axis assembly is provided through the use of conventional drive circuitry located in the drive cabinet portion of the robot control 27. The direct coupled DC servo motor arrangements include a motor-tachometer package and a resolver or an encoder. The tachometer provides speed feedback information to the control console while the resolver supplies the control console with the position feedback information directly from the drive motor. This produces a highly stable servo response. The X axis assembly 33 consists of a closed cell type of construction which minimizes the torsional deflection of the X axis carriage as it travels along the X axis guidance system, thereby providing the desired system accuracy and repeatability. The X axis guidance system includes two three-inch diameter ground guide rails 41 which provide maximum rigidity and stiffness for the torsional-type bending modes. The dual railway system which is supported by the members SM further assures a smooth low friction travel of the X axis carriage in response to the closed loop DC servo control. The X axis carriage is coupled to the guide rails 41 and 43 by linear bearings which are preloaded and sealed to protect the bearings from dirt. The mechanical drive for the X axis assembly is a rack and pinion mechanism consisting of a rack and pinion shaft which is direct coupled to a DC motor tachometer package.

The Y axis assembly 35, functions as an arm extending perpendicularly from the X axis assembly 33. The Y axis assembly includes a support member assembly and a double railway arrangement which minimizes the stress and rotational deflections during the Y axis travel of the Y axis carriage as well as during the positioning of the Z axis assembly 37 within the work zone. The guide rails are protected by bellows covers 43.

The Z axis assembly 37 employs a ball screw mechanism consisting of a ball screw in a fixed nut in combination with a way mechanism consisting of guide rails to transport the Z axis carriage in response to the drive motor-tachometer package motor. The dual railway mechanism functions similarly to that described above with respect to the X and Y axes. Additional unique features incorporated into the orthogonal axis manipulator described hereinabove are disclosed in U.S. patent application Ser. No. 485,076 which is assigned to the assignee of the present invention and which is incorporated herein by reference as it fully sets forth.

Figure 2:
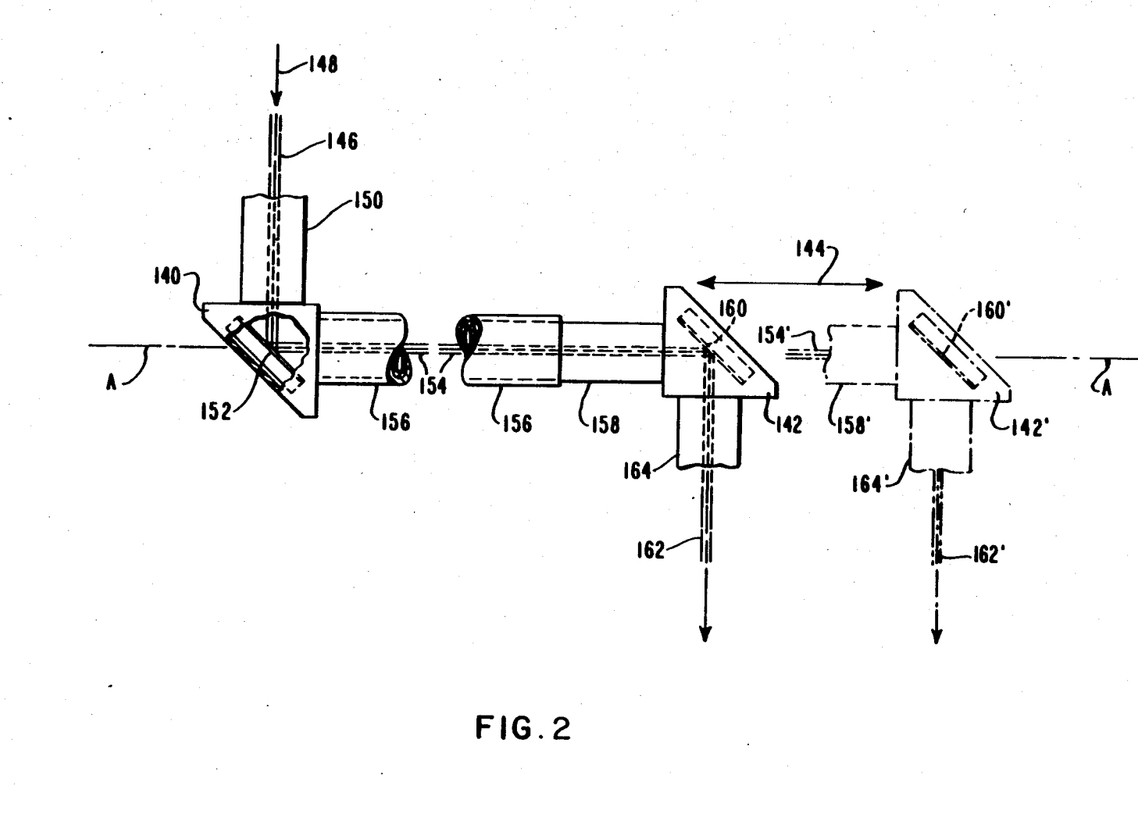
FIG. 2 illustrates an optical joint utilized in the laser beam delivery system described herein which is attached in slidable association with a support arm defining one axis of the orthogonal manipulator shown in FIG. 1.

The laser beam delivery system used with this robot comprises in its simplest form, a series of joints which are attached to a support member or arm defining one axis of movement of the robotic system 13. The configuration shown in FIG. 2 illustrates an embodiment of the laser beam delivery system utilized in combination with the Unimate Series 6000 orthogonal axis manipulator 13. This configuration permits a synchronous movement in conjunction with the displacement of the various arms defining the axis of the manipulator 13. As long as the incident light beam lies on the axis of motion A of the optical joint, the laser beam will be delivered and the laser beam delivery system will function properly. It should be appreciated that this axis of motion can be one of either axial or rotational movement of a combination thereof. More particularly, FIG. 2 comprises two optical joints 140 and 142, which are disposed in axially displaced relationship with each other. Returning briefly to the system's configuration shown in FIG. 1, the optical joints 140 and 142 can be seen to direct the beam along the Y axis of the orthogonal axis manipulator 13. Assuming for purposes of discussion that joint 140 is fixed in space, joint 142 can move either toward or away from joint 140 along its axis of motion A in the direction shown by the arrow 144. In other words, joint 142 can alternatively assume the positions shown by reference numerals 142 and 142', inter alia. When a collimated incident light beam 146 passes, as shown in the direction of the arrow 148, through a tubular member 150 into the joint 140, it strikes a reflective member 152 and is reflected at an angle of 90° along the light beam 154. This light beam 154 passes through a tubular member 156, along the axis of motion A, and into the joint 142. As can be seen in FIG. 2, joint 142 is rigidly attached to a tubular member 158. Tubular member 158 is associated in a sliding relation with tubular member 156. As these two slidably associated members move axially with respect to each other in the direction shown by the arrow 144, joint 142 moves either toward joint 140 or away from it. As long as the reflective member 160 of joint 142 is positioned at a constant angle of 45° to the light beam 154, the resulting reflecting light beam 162 passes from the reflective member 160, out of the optical joint 142 and through the tubular member 164 in the direction which is at an angle of 90° to the light beam 154. Therefore, as the optical joint 142 moves in this axial relationship with the optical joint 140, the resulting deflected light beam 162 will move in a linear path. It should further be understood that the joint 142 which is shown in dashed line in FIG. 2 and its associated components which are designated with similar primed reference numerals represent an alternative position of this optical joint.

The configuration and movement of the laser beam delivery optics and tubular members described above in conjunction with the Y axis of the manipulator are consistent with the movement of the manipulator along both the X axis and the Z axis. Accordingly, a further appreciation of the laser beam delivery system in conjunction with both the X and Z axis will be had by review of the aforedescribed Y axis disposition.

The system described herein can be used with any of a variety of commercially available lasers. By way of example, a system has been constructed incorporating an Everlast EFA 51 $CO_2$ laser manufactured by Coherent, Inc. The axial-flow laser has a power rating of 1,250 watts. Various laser systems and types may be readily interfaced with the Series 6000 robot described herein. Since laser selection is highly application dependent, this interface flexibly assures that the proper manufacturing requirements are satisfied during cell system configuration. It should also be appreciated that all industrial type lasers require controlled water type coolant systems. While cooling can be effected through a variety of options, the system described herein utilizes a recirculatory closed loop water cooling system. This system is generally indicated schematically at reference character 25.

Additionally, the work cell shown in FIG. 1 utilizes an air filtration drying and recirculating system indicated at 20. A suitable system is commercially available in Balstron Filter Products "Air Dryer Model 75". The reflective surfaces within the optical joints (i.e., optical joint 140 in FIG. 2, is a highly reflective material). Dust and condensation on these reflective surfaces has been identified as a potentially major problem in a laser beam delivery system such as described herein. The presence of dust and condensation within the laser beam delivery system 17 can cause beam blooming and will render the system inoperative. It is preferred that a dry air filtration system be utilized in order that the mirrors remain substantially free of dust and condensation during the system's operation and a desired embodiment is maintained within the delivery system. This previouslyidentified commercially-available filtration system also includes a bed of absorbent granules which remove such constituents as water vapor, carbon dioxide, sulphur hexafluoride, etc. which cause thermal beam blooming within the laser beam delivery system.

The exhaust system 19 shown in FIG. 1 includes a conduit system 19' which terminates proximate the laser beam delivery point 30 of the manipulators 13. It should be appreciated due to the generic material processing nature of such a system as described herein, some materials will emit toxic fumes during laser processes. Accordingly, this exhaust system 19 provides a pick-up nozzle disposed proximate the wrist and directed toward the source of the fumes. Means are provided in association with the pick-up nozzle to generate the negative pressure necessary to draw the fumes from the work area for ultimate discharge and/or filtration.

The work cell illustrated in FIG. 1 also includes a plexiglass enclosure surrounding the working envelope in order to provide a substantial margin of safety. The plexiglass enclosure, due to the characteristics of plexiglass, will serve a multiplicity of purposes. For example, as plexiglass is hit by the laser when, for example, one is using a 10.6 micron $CO_2$ laser, smole emits prior to burn-through and serves as an early warning signal to any individuals proximate the work cell. Additionally, plexiglass allows the operator to view the system operation with decreased risk of harm. Finally, the plexiglass can serve as a line of defense against unauthorized personnel entering the work envelope. The plexiglass can be provided with a series of stationary panels as at 173 supported by framework members 175. A sliding door arrangement 177 and 179 supported by track members 181 can allow ease of entry and exit from the work cell by work personnel. Additionally, an interlock system can be provided as at 183 which indicates to the robot controller that the sliding plexiglass doors are opened and that the laser operated functions should be terminated until an operator can investigate the malfunction.

Figure 3:
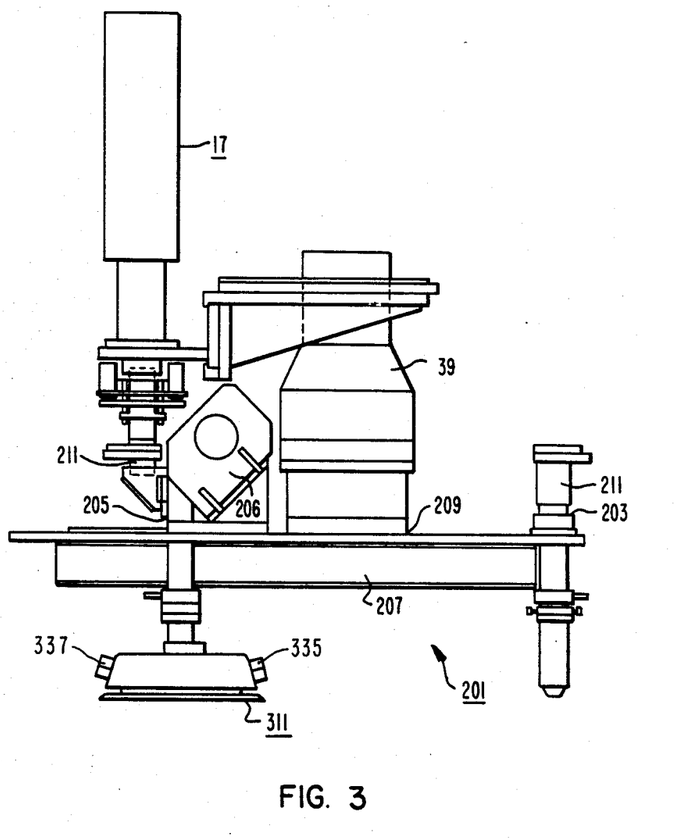
FIG. 3 is an elevation of the robot carousel end-of-arm tooling of this invention without exhaust ducts.
Figure 4:
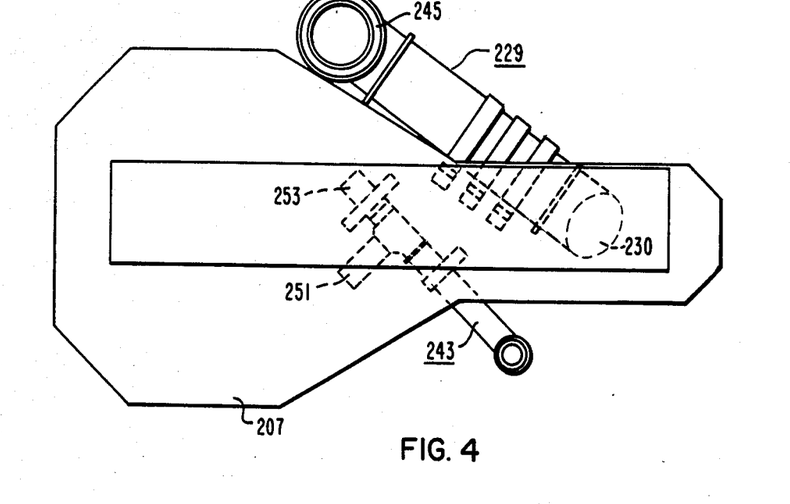
FIG. 4 is a partial plan view of the carousel end-of-arm tooling of this invention illustrating the exhaust ducts.
Figure 5:
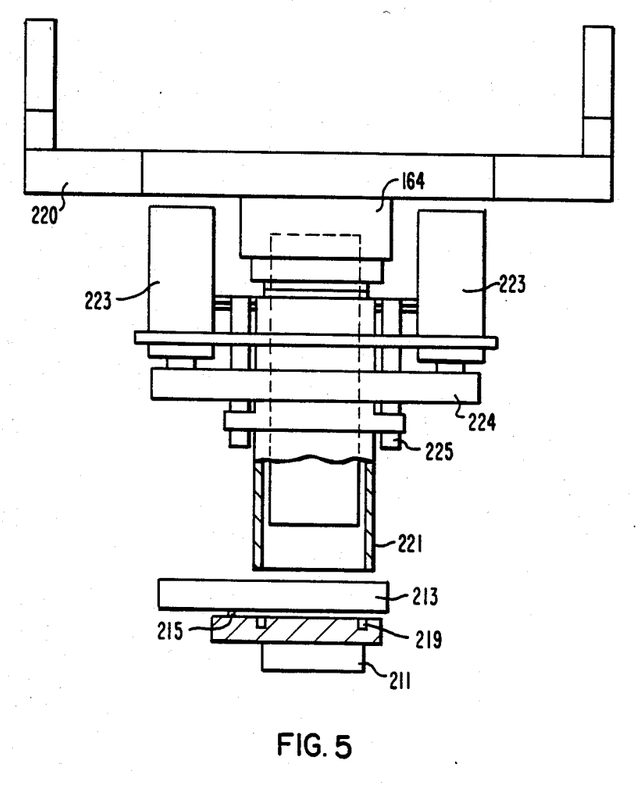
FIG. 5 is an isometric view of the light leak-proof coupling apparatus for the end-of-arm tooling by which this tooling is coupled to the laser beam delivery system.
Figure 6:
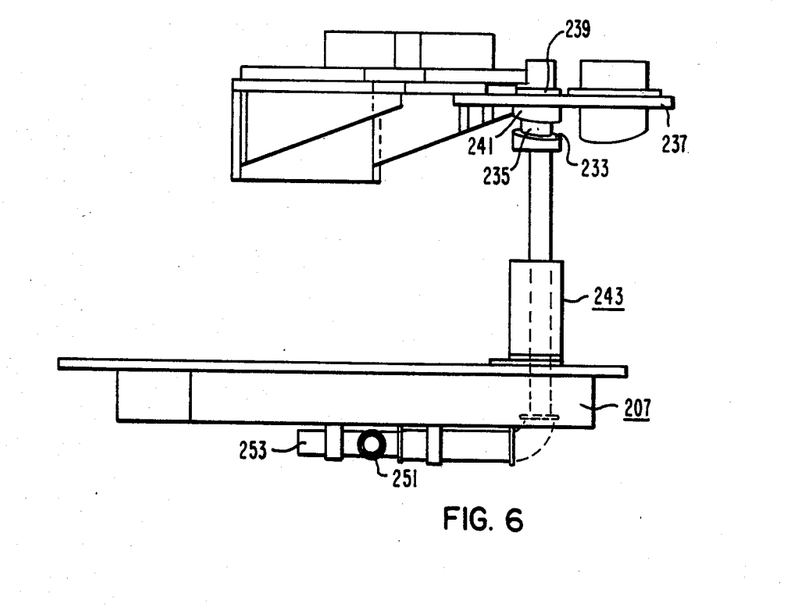
FIG. 6 is a partial elevational view of the exhaust coupling apparatus of this invention.

Turning now to FIGS. 3 through 6, there is illustrated the carousel end-of-arm tooling apparatus according to the teachings of this invention. The side elevational view of the carousel 201 as shown in FIG. 3 readily demonstrates the major features of the carousel with the exception of the exhaust ducts which are shown in FIGS. 4 and 6. The benefits of this invention can be best utilized when the carousel 201 is provided with at least two separate tooling stations as at 203 and 205. It is to be understood that any number of individual tooling stations can be provided on a carousel with the number being limited only by the practical applications that can be achieved through the use of additional tooling stations. The carousel 201 includes a base member 207 which is adapted to be removably mounted onto the face plate 209 of the modular wrist 39. An excellent wrist for use in combination with the carousel of this invention is the Series 6000 heavy duty wrist and axis module which is available from Westinghouse Electric Corporation. This heavy duty wrist offers many benefits over conventional rotary actuators. Among the benefits are the fact that the wrist is fully servo-actuated, it has an excellent degree of stiffness, it provides accuracy and repeatability and it lends itself to future options due to the modularity of the wrist design. The base member 207 is adapted to receive thereon two or more tooling stations. Accordingly, the actual dimensions of the base member 207 can be modified according to the desired application. For example, the base member shown herewith is provided with a surface area sufficient to accommodate two distinct tooling stations. In other modifications of this base member, an additional space can be provided for further individual tooling stations.

The carousel end-of-arm tooling arrangement illustrated herein includes the first tooling station 203 which comprises focussing optics for use in laser material processing applications. Such optics are commercially available and will not be described herein. The second tooling station 205 includes a beam scanning assembly 206 which includes an oscillating mirror working into a focussing lens assembly or a focussing oscillating mirror. Such a device is used where extremely short pulse durations such as 1 microsecond or less are required for the laser to work thermally fragile materials. Such a device is the Model 430 Switch Assembly which is available commercially from Photon Sources.

I have also developed a light leakproof assembly which can be utilized for such tooling in order to provide appropriate interconnection between the laser beam delivery system and the carousel mounted tooling.

Considering FIGS. 1, 3 and 5, the light leakproof coupling provides interconnection between the laser beam delivery system 17 and the individual tooling, i.e., 203 and 205 provided on the carousel 201. Each individual tooling station is provided with a conduit means 211 through which the laser beam is conveyed to the optics portion disposed therebelow. The conduit 211 includes a spring loaded cover assembly 213 which pivots about a pivot point 215 disposed off to the side of the conduit. As the individual tooling station is rotated into position through the movement of the base portion 207 as affected by the wrist 39, the spring loaded cover assembly 213 is pushed away and the selected tooling station is rotated into position beneath the conduit 164 of the laser beam delivery system 17. As the cover 213 is pushed away, the beam transmission tube or conduit 211 is exposed. The cover assembly 213 is provided in order to cap each set of optics and prevent foreign material from contaminating the lens. The conduit 211 or beam transmission tube of the tooling provided on the carousel has an inside/outside counterbore or groove 219 disposed in the top thereof.

The terminal portion of the laser beam delivery system is mounted on a bracket 220 on the Z axis of the robot as shown in FIGS. 1 and is provided with a transmission tube 221 which is sized for insertion into the inside/outside counterbore 219. The transmission tube 221 is linearly movable with respect to the conduit defining the beam path of the beam delivery system and it is so movable through the use of actuating means 223. The actuating means 223 can be either, for example, electric solenoids or pneumatic cylinders. The actuating means 223, when actuated, lift the transmission tube 221 by the bracket 224 associated with the tube 221 to an elevation which is sufficient to permit the movement of the spring loaded cover assembly 213 from the conduit 211 of the tooling. The elevated position of the transmission tubing must be sufficient to permit the carousel base to rotate the individual tooling from beneath the laser beam delivery system. The movable transmission tube 221 is maintained in both a linear and parallel relationship with the conduit of the laser beam delivery system by means of a self-centering linkage means 225. The transmission tube 221 has a close fit with the terminal portion of the laser beam delivery system and drops into the aforementioned inside/outside counterbore or groove 219. This results in a light tight coupling since a collimated laser light beam would be required to turn 90° to escape.

The end effector tooling 203 consists of a generic cutting nozzle. The end effector tooling 205 is a metal cladding device which uses in part the aforedescribed commercially available laser beam oscillating means. There is additionally incorporated with the tooling 205 a generic shield 311 for welding, surfacing and cladding operations. This shielding apparatus is described in detail in copending Westinghouse patent application Ser. No. 750,721, Westinghouse Case No. 52,817.

The carousel apparatus 201 includes therewith exhaust ducting means which are disposed for the removal of toxic fumes generated during metal processing. Two distinct exhaust systems are shown in conjunction with the embodiment described herein. The first exhaust system 229 includes an exhaust port 230 disposed proximate the working end of the tooling station 203. A second exhaust system 243 is provided for the second tooling station. The interconnect portion 231 of second system 243 as shown in FIG. 6 has an angled face 233 and can include a compliant material 235 disposed thereon. A fixed support structure 237 which depends from the Z axis of the robot has an exhaust conduit member 239 with a complementary face 241 adapted to interface with the face portion 233 of the exhaust conduit 229. The complementary angles of the face portions 233 and 241 facilitate a good mating between the two exhaust pipes when the carousel apparatus 201 rotates a tooling station into the desired position. The first exhaust system 239 is similarly appointed with a face portion 245 which is angled to provide the proper seat with the fixed exhaust equipment 247 disposed on the X axis of the robot. Accordingly, as the carousel apparatus is rotated from a first position in which a first tooling station is aligned with and interconnected with the laser beam delivery system, an exhaust system is interconnected with the fixed exhaust system of the work cell. Thereupon, when the second tooling station is rotated into position through the movement of the carousel apparatus, the first exhaust system is disconnected and the second exhaust system is interconnected. The angular gaskets make a seal between the end-of-arm tooling pipe and the vacuum system pipe when the particular set of tooling is rotated under the laser beam.

The second exhaust system 243 includes a pair of exhaust ports 251 and 253 which are connected with ducts (not illustrated) to the smoke removal hood of the generic shield 311 by means of ducts 335 and 337 thereof shown in FIGS. 3 and 6.

What is claimed is:

1. A carousel tooling apparatus comprising:
a base member adapted to be mounted onto a wrist assembly of an industrial manipulator such that rotational movement is imparted to said base member thereby said base member having a first tooling station thereon and at least a second tooling station thereon wherein the rotation movement of said base member, as effected by said wrist assembly, selectively presents each of said tooling stations to a terminal location of a laser beam delivery system;

said first tooling station comprising means defining a first set of focussing optics and means for coupling said means for defining the first set of focussing optics with said laser beam delivery system wherein a predetermined focal length, spot size or intensity of said beam is established; and said second tooling station comprising means defining a second set of focussing optics and means for coupling said means for defining the second set of focussing optics with said integral laser beam delivery system;

said means for coupling the tooling station optics with the terminal location of a laser beam delivery system comprising a conduit having a normally biased closed cover means which is rotatable to an open position through interaction with the laser beam delivery system, said conduit defining a counterbore-groove therein, the laser beam delivery system including at the terminal location thereof a vertically movable transmission tube size for insertion into the counterbore groove and means operably associated with the transmission tube for effecting the vertical movement thereof.

2. In combination with an integrated robot-laser comprising:

a robotic system having one or more mechanical joints defining at least in part a fixed axis of motion and a second axis of motion, which axes of motion define a contoured path through the robotic system's geometric range of motion, wherein each of said mechanical joints defines in part a frame member; and a wrist assembly adapted to mountably receive thereon an end effector or the like to impart at least rotational movement thereof; and an integral laser beam delivery system for the delivery of a beam along any point within said geometric range of motion to a terminal location proximate said wrist assembly, said integral laser beam delivery system including a plurality of optical joints and tubular members disposed between adjacent optical joints and through which tubular members the beam passes as it travels from optical joint to optical joint;

a carousel tooling apparatus comprising;

a base member adapted to be mounted onto said wrist assembly such that rotational movement is imparted thereto, said base member having a first tooling station thereon and at least a second tooling station thereon wherein the rotation movement of said base member, as effected by said wrist assembly, selectively presents each of said tooling stations to said terminal location of said laser beam delivery system;

said first tooling station comprising means defining a first set of focussing optics and means for coupling said means for defining the first set of focussing optics with said integral laser beam delivery system wherein a predetermined focal length, spot size or intensity of said beam is established; and said second tooling station comprising means defining a second set of focussing optics and means for coupling said means for defining the second set of focussing optics with said integral laser beam delivery system.

* * * * *